F. E. PARK.
AUTOMOBILE WHEEL HUB CONSTRUCTION.
APPLICATION FILED JUNE 22, 1914.
1,261,430.
Patented Apr. 2, 1918.
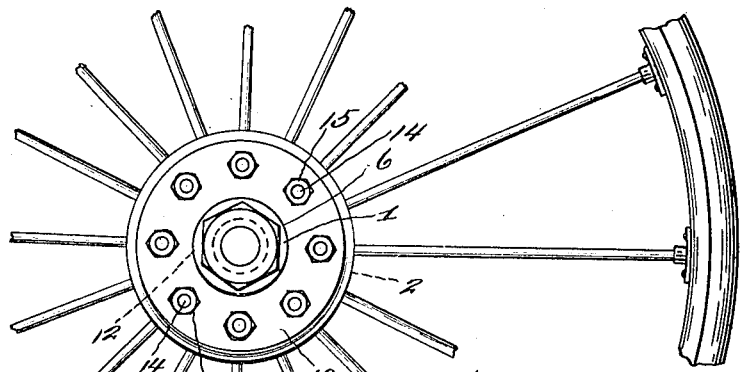
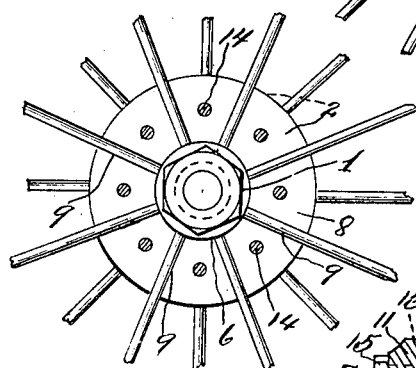
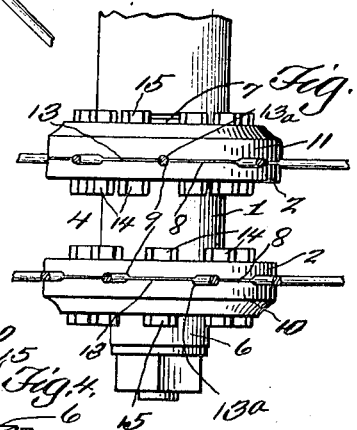
Witnesses
Inventor
Fred E. Park,
By D. Swift &C.,
his Attorneys

UNITED STATES PATENT OFFICE.

FRED E. PARK, OF LA GRANGE, ILLINOIS.

AUTOMOBILE-WHEEL-HUB CONSTRUCTION.

1,261,430.

Specification of Letters Patent.

Patented Apr. 2, 1918.

Application filed June 22, 1914. Serial No. 846,526.

*To all whom it may concern:*

Be it known that I, FRED E. PARK, a citizen of the United States, residing at La Grange, in the county of Cook and State of Illinois, have invented a new and useful Automobile-Wheel-Hub Construction; and I do hereby declare the following to be a full, clear, and exact description of the invention, such as will enable others skilled in the art to which it appertains to make and use the same.

This invention relates to vehicle wheels, and to automobile wheels in particular, and its special aim is to provide a hub of such an efficient, simple, improved and commercially desirable structure, as to render all automobile wheels more serviceable, durable and practical.

One of the objects of the invention is to provide an improved, simple, efficient and desirable hub structure for automobile wheels consisting of a hub body having a pair of annular flanges, said flanges having their outer faces beveled radially from the body and toward each other, in combination with circular plates fitting the hub body adjacent said flanges for clamping the spokes, said plates having their inner faces beveled and being complemental to and fitting the flanges, and being complemental and adapted to be clamped toward each other, and so constructed whereby the hub body may be removed from the axle spindle and the plates brought together on the spindle, likewise bringing the inner ends of one or both sets of the spokes together to support the spokes, and whereby the adjacent corner edges of said plates between their staggered grooves and the outer ends of said grooves may bite into and prevent slipping of said spokes. By this construction the plates constitute means for holding one or both sets of spokes (preferably both sets), in order to support the spokes, whereby the spindle may be supported in the plates, consequently supporting one corner of the body of the vehicle, while the hub body is removed, for repairing, such as grinding or cleaning the same.

In practical fields the details of construction may necessitate alterations, falling within the scope of what is claimed.

The invention comprises further features and combination of parts, as hereinafter set forth, shown in the drawings and claimed.

In the drawings:—

Figure 1 is a view in side elevation of the hub construction embodying the efficient and practical features of the invention.

Fig. 2 is a view with one of said plates removed.

Fig. 3 is a plan view, not only showing the staggered relations between the spokes, but also showing the staggered relations between the bolts, thereby permitting one set of bolts to be removed without interference with the other set and vice versa.

Fig. 4 is a sectional view of Fig. 1.

Fig. 5 is a detail view of the hub body, showing one of the plates partially removed, and the other plate entirely removed.

Fig. 6 is a view showing the two plates 10 and 11 engaging the spindle of an axle, and clamping a spoke.

Referring more especially to the drawings, 1 designates the hub body having a pair of annular flanges 2, forming integral parts of the hub body, and spaced apart from each other forming an annular U-shaped channel 4, and also spaced from the ends of the hub body. The portions of the hub body beyond said flanges are reduced, and designated by the numerals 6 and 7. The outer faces 8 of said flanges are beveled outwardly, downwardly and toward the reduced portions 6 and 7, and provided with radial grooves 9. The grooves of one flange are arranged in staggered relation with the grooves of the opposite flange. Annular plates 10 and 11 having circular openings 12 are fitted upon the reduced portions 6 and 7. The inner faces 13 of said annular plates are beveled correspondingly to fit the beveled faces of said flanges, to which said annular plates are clamped by the bolts 14 having nuts 15, said bolts passing through the flanges and the plates between said spokes. One set of bolts are arranged in staggered relation with the opposite set. As shown in Fig. 6 it will be seen that the hub body is entirely removed from the spindle, and the spokes are clamped between the two outer plates 10 and 11 which have been removed from the hub body, their openings loosely engaging the spindle of the axle. In this particular manner the hub body is removed, in case of necessary repairs, such as regrinding or cleaning, while the spokes and said outer plates remain intact, said plates on the spindle, and in support of the wheel rim. It will be observed that the annular U-shaped channel is of such a width as to barely but easily permit, the removal of said bolts of one flange, without interfering with the bolts of the opposite flange. It will be observed that the grooves of said flanges and plates are only partially semi-circular in cross section, in order to hold said plates separated from the flanges, whereby said plates clamp firmly against the spokes, in order to hold them rigidly.

The invention having been set forth, what is claimed as new and useful is:—

A hub body having a pair of annular flanges, said flanges having their outer faces beveled radially from the body and toward each other, said body beyond said flanges having extensions, circular plates fitting said extensions, the adjacent faces of the plates having radial grooves in staggered relations, and the outer faces of the flanges having grooves registering with said grooves respectively of the plates, means for clamping the plates to the flanges, said plates having their inner faces beveled and being complemental to and fitting the flanges, and being complemental and adapted to be clamped toward each other, whereby the hub body may be removed from the axle spindle and the plates brought together on the spindle to support the spokes, the adjacent corner edges of said plates between their staggered grooves and the outer ends of said grooves biting into and preventing slipping of said spokes.

In testimony whereof I have signed my name to this specification in the presence of two subscribing witnesses.

FRED E. PARK.

Witnesses:
CHAS. W. NORTHERY,
G. M. COSSETT.

Copies of this patent may be obtained for five cents each, by addressing the "Commissioner of Patents, Washington, D. C."